United States Patent Office 3,201,363
Patented Aug. 17, 1965

3,201,363
EXTRUSION AIDS FOR POLYETHYLENE
Harold M. Spurlin, Wilmington, Del., assignor to Hercules Powder Company, Wilmington, Del., a corporation of Delaware
No Drawing. Filed Sept. 20, 1962, Ser. No. 225,124
7 Claims. (Cl. 260—30.4)

This invention relates to improvements in extrusion characteristics of high density polyethylene. More particularly, it relates to addition of organic additives to high density Ziegler-type polyethylene in order to improve surface characteristics of extrudates prepared therefrom.

In recent years, high density polyethylene made by means of a transition metal catalyst—so-called Ziegler-type polyethylene—or by a catalyst comprising chromium oxide associated with another oxide such as silica or alumina has been found to be quite useful in a wide range of applications due to its unique combination of properties such as chemical inertness, durability, moisture vapor impermeability, stiffness, etc. This combination of properties is especially useful in the preparation of bottles for storage of chemicals and the like.

However, when bottles are manufactured from the aforesaid polymers by an extrusion and blowing process, it has been found that the articles thus produced sometimes have an objectionably rough surface. The cause of this roughness is not known for certain but it has been theorized that it may be caused by a multitude of tiny melt fractures on the surface caused by stresses created on that surface during the extrusion process and subsequent cooling. It is in any event a problem that is not shared by low density polyethylene made by free radical processes.

The effect of the rough surface is to reduce the effective thickness of the wall of the container sought to be manufactured and correspondingly to reduce the strength, vapor impermeability, and other characteristics which the polyethylene should impart to such a container. In introducing the bottles to the consumer market, another drawback is encountered—namely, the bottles do not present the desired pleasing appearance when the surface is thus roughened.

In the past, polyethylene exhibiting this quality of surface roughness has had to be downgraded to a quality classification for use in articles not requiring the high quality material demanded by the bottle market. Such a quality downgrading, of course, resulted in a lessening of the value of the material with resultant economic loss to the manufacturer or fabricator.

This invention has as its object to provide a means of eliminating the rough surfaces encountered in extruded objects produced from high density polyethylene. According to the invention, roughness of the surface of such polyethylene during extrusion can be substantially eliminated or lessened by the incorporation into the polyethylene of a small amount, preferably from about 0.01 to 1%, based on the weight of the polyethylene, of an inner anhydride of a dibasic organic acid. By the term "inner anhydride" is meant an anhydride formed by abstraction of a molecule of water from the two carboxyl groups in a single molecule of a polybasic organic acid, resulting in formation of a cyclic compound having the general structure:

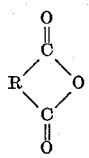

where R is an organic radical providing a chain of 2 to 3 carbon atoms between the 2 carbons depicted in the formula. Examples of inner anhydrides of polybasic organic acids which are useful in the method of this invention are succinic anhydride, mono- or polyalkyl substituted succinic anhydrides, glutaric anhydride, mono- or polyalkyl substituted glutaric anhydrides, phthalic anhydride, substituted phthalic anhydride such as monochlorophthalic anhydride, and mono- or poly-substituted phthalic anhydrides, terpinene-maleic anhydride adduct, trimellitic anhydride and pyromellitic anhydride. In some cases the acids corresponding to these anhydrides can be used to generate the anhydride in situ.

By high density polyethylene is meant the high molecular weight solid polyethylene having a density above about 0.94 produced by polymerizing ethylene at comparatively low pressures and temperatures. Such polymers can be made, for example, by use of a transition metal catalyst of the type disclosed by Ziegler in British Patent 799,392 or a catalyst comprising chromium oxide supported on another oxide such as silica, alumina, thoria, or zirconia as disclosed by Hogan and Banks in U.S. 2,825,721.

In the transition metal catalyzed process, mixtures of an organometallic compound of a Group I-A, II-A, or III-A metal, such as an aluminum alkyl or aryl, and a reducible compound of a Group IV-B, V-B, or VI-B transition metal including thorium and uranium are employed as catalysts for the polymerization. The polymerization is carried out under relatively mild conditions of pressure and temperature, e.g., at 1–100 atmospheres and 50–250° C. The organometallic component of the catalyst is preferably an aluminum alkyl or an alkyl aluminum halide. The transition metal component of the catalyst is preferably titanium tetrachloride, but may be any reducible compound of titanium, zirconium, thorium, uranium, tantalum, chromium, vanadium, tungsten, etc. The catalyst is placed in a pressure vessel containing an inert liquid reaction medium such as a saturated hydrocarbon, and the gaseous ethylene is introduced into the vessel under the desired reaction pressure, e.g., 1–100 atmospheres. The vessel and contents are heated at the desired reaction temperature until the pressure within the vessel reaches a low fixed value. The crude polymerizate is then removed from the vessel and is treated with methanol or the like to "kill" or deactivate the catalyst. The solid polyethylene is then filtered off and is washed with methanol to remove the decomposed metal catalyst and thereby obtain a substantially ash-free odorless polyethylene product.

In the chromium oxide catalyzed process, the catalyst comprises a support or base of particulate alumina, zirconia, silica, or thoria impregnated with chromium oxide ($CrO_3$). The preferred support is an alumina-silica composite containing a major proportion of silica. The ethylene monomer is contacted with a slurry of the chromium oxide catalyst in an inert diluent which is preferably a saturated aliphatic hydrocarbon at a temperature between 275 and 375° F. The reaction pressure need only be high enough to assure that the diluent remains in the liquid state and the ethylene monomer remains dissolved in the diluent sufficiently to permit polymerization. The pressure is normally atmospheric to about 50 atmospheres.

The high density polyethylenes are essentially linear and unbranched polymers that may be found to have less than 3.0 and frequently even less than 0.03 substituent methyl groups per 100 methylene units in the polymer molecule. The polymers have high densities, usually at least 0.94–0.97 gram per cubic centimeter, have melting points in the neighborhood of 125–135° C., are highly crystalline in nature, almost to their melting points, and are insoluble in most solvents at ordinary temperature. Any high density polyethylene can be benefited by the technique of this invention.

Before describing the invention further, the following examples are presented as illustrative of the process of the invention.

*Example 1*

A polymerization catalyst was prepared by mixing ethylaluminum sesquichloride with $TiCl_4$ in a 4:1 molar ratio in a saturated hydrocarbon medium to obtain a solid precipitate. The solid precipitate, along with an additional quantity of ethylaluminum sesquichloride, was added to a polymerization vessel containing an inert, saturated aliphatic hydrocarbon as a polymerization reaction medium. The vessel was freed of air by purging with nitrogen and evacuating. Ethylene, containing 36 mole percent hydrogen as a molecular weight control agent, was charged to the reaction vessel to a pressure of 73 p.s.i.a. and allowed to polymerize. The resulting product had a density of 0.962, a melt index ($i_2$, 190° C.) of 0.3 and a reduced specific viscosity (RSV) of 2.8.

To 99 parts by weight of the high density polyethylene was added 1 part by weight of succinic anhydride. The resulting mixture was melted, extruded and chopped into flakes to disperse the succinic anhydride uniformly throughout the polymer. The resulting polymer granules were then extruded with a 1.25 inch Hartig extruder at a maximum temperature of 190° C. through a ⅛″ single hole mild steel die. The resulting strand of extruded polyethylene had very smooth surfaces when compared with a control strand made of polyethylene from the same production batch to which no succinic anhydride additive had been added. The surface of the control strand was extremely rough.

*Examples 2–16*

Following the procedure of Example 1 and using the same polymer, the polybasic acid inner anhydrides shown in the following table were evaluated for their effect on the surface characteristics of extruded high density polyethylene.

| Example | Material | Concentration, Percent | Surface Quality [1] |
|---|---|---|---|
| 2 | Terpene—maleic anhydride reaction product | 1.0 | 1 |
| 3 | ----do---- | 0.5 | 1 |
| 4 | ----do---- | 0.35 | 2 |
| 5 | ----do---- | 0.2 | 2 |
| 6 | Tetrapropenyl succinic anhydride | 1.0 | 2 |
| 7 | n-Octyl succinic anhydride | 0.5 | 2 |
| 8 | n-Hexadecyl succinic anhydride | 0.5 | 1 |
| 9 | Glutaric anhydride | 1.0 | 1 |
| 10 | ----do---- | 0.5 | 2 |
| 11 | Trimellitic anhydride | 1.0 | 1 |
| 12 | Pyromellitic anhydride | 1.0 | 2 |
| 13 | Phthalic anhydride | 1.0 | 2 |
| 14 | Dilinoleic acid—maleic anhydride adduct | 1.0 | 3 |
| 15 | Allo-ocimene dimer—maleic anhydride adduct | 1.0 | 1 |
| 16 | Monochlorophthalic anhydride | 1.0 | 3 |
| | Control (no additive) | | 4 |

[1] 1=excellent—complete absence of roughness visually and to the touch; 2=good—surface quality acceptable though roughness is perceptible; 3=fair—superior to control but not commercially acceptable quality; 4=poor—surface rough both visually and to the touch.

In each case there was a significant improvement in surface quality of the resultant extrudate. In several cases (indicated in the table as 1 or excellent) surface roughness was completely eliminated. When the compositions of the examples are employed in the production of bottles by the familiar blow molding technique, the finished products have very smooth surfaces, suitable for commercial utilization in all applications where high density polyethylene bottles are normally used.

The precise chemical or physical explanation of this surprising discovery is not known at this time. However, it has been observed in some cases that if a charge of high density polyethylene treated with one of the additives of this invention is processed in the extrusion equipment, followed by a charge of untreated material, the beneficial effect of the anhydride carries over for a substantial length of time after the treated material has been completely extruded and only untreated material remains. From this observation, it appears that the improvement in surface characteristics may be the result of an alteration of the metal die surface by the additives rather than some direct chemical or physical interaction between the additive and the high density polyethylene.

What I claim and desire to protect by Letters Patent is:

1. A composition consisting essentially of a blend of high density transition metal-catalyzed polyethylene and 0.01 to 1.0% by weight of an inner anhydride of a polycarboxylic organic acid.

2. A composition consisting essentially of high density transition metal-catalyzed polyethylene and 0.01 to 1.0% by weight of an inner anhydride of a polycarboxylic organic acid selected from the group consisting of succinic anhydride, trimellitic anhydride, phthalic anhydride, tetrapropenyl succinic anhydride, n-octyl succinic anhydride, n-hexadecyl succinic anhydride, pyromellitic anhydride, glutaric anhydride, dilinoleic acid-maleic anhydride adduct, and allo-ocimene-maleic anhydride adduct.

3. The composition of claim 1 wherein the inner anhydride is succinic anhydride.

4. The composition of claim 1 wherein the inner anhydride is n-hexadecyl succinic anhydride.

5. The composition of claim 1 wherein the inner anhydride is glutaric anhydride.

6. The composition of claim 1 wherein the inner anhydride is trimellitic anhydride.

7. The composition of claim 1 wherein the inner anhydride is allo-ocimene-maleic anhydride adduct.

References Cited by the Examiner

UNITED STATES PATENTS 2,973,344  2/61  Fasce _____ 260—78.4

MORRIS LIEBMAN, *Primary Examiner.*